United States Patent [19]

Tsujimoto

[11] Patent Number: 5,327,354
[45] Date of Patent: Jul. 5, 1994

[54] CONTROL SYSTEM FOR AUTOMATIC WAREHOUSING FACILITY

[75] Inventor: Kazushi Tsujimoto, Kasugai, Japan

[73] Assignee: Daifuku Co., Ltd., Osaka, Japan

[21] Appl. No.: 100,697

[22] Filed: Jul. 30, 1993

Related U.S. Application Data

[63] Continuation of Ser. No. 721,124, Jun. 26, 1991, abandoned.

[30] Foreign Application Priority Data

| | | | |
|---|---|---|---|
| Jul. 10, 1990 | [JP] | Japan | 2-183471 |
| Jan. 25, 1991 | [JP] | Japan | 3-007348 |
| Jan. 25, 1991 | [JP] | Japan | 3-007349 |
| Jan. 25, 1991 | [JP] | Japan | 3-007350 |
| Jan. 25, 1991 | [JP] | Japan | 3-007351 |

[51] Int. Cl.⁵ ............... G06F 15/46; B65G 1/06
[52] U.S. Cl. .................... 364/478; 364/188; 364/189; 414/273
[58] Field of Search ........... 364/188, 189, 468, 478, 364/403, 424.07; 414/4, 273; 976/DIG. 367

[56] References Cited

U.S. PATENT DOCUMENTS

| | | | |
|---|---|---|---|
| 3,719,287 | 3/1973 | Billingley et al. | 414/273 |
| 3,817,406 | 6/1974 | Sawada et al. | 414/273 |
| 3,958,102 | 5/1976 | Burt | 414/273 |
| 4,039,785 | 8/1977 | Ziemann | 364/478 |
| 4,547,844 | 10/1985 | Adams | 364/189 |
| 4,578,562 | 3/1986 | Lindström et al. | 364/189 |
| 4,669,047 | 5/1987 | Chucta | 364/468 |
| 4,736,826 | 4/1988 | White et al. | 976/DIG. 367 |
| 4,762,455 | 8/1988 | Coughlan et al. | 414/4 |
| 4,764,078 | 8/1988 | Neri | 414/273 |
| 4,783,740 | 11/1988 | Ishizawa et al. | 364/478 |
| 4,804,307 | 2/1989 | Motoda | 414/273 |
| 4,887,218 | 12/1989 | Natarajan | 364/468 |
| 5,006,996 | 4/1991 | Nakamura et al. | 364/478 |
| 5,031,109 | 7/1991 | Gloton | 364/478 |
| 5,113,349 | 5/1992 | Nakamura et al. | 364/424.07 |

Primary Examiner—Jerry Smith
Assistant Examiner—Paul Gordon
Attorney, Agent, or Firm—Barnes, Kisselle, Raisch, Choate, Whittemore & Hulbert

[57] ABSTRACT

The invention relates to a control system for an automatic warehousing facility. Receipt into and disbursement from racks capable of storing goods in a plurality of lots are carried out by a goods handling device. A control panel disposed at the ground side controls the handling device to control incoming and outgoing handling of goods. Inventory control is carried out by manipulating a plurality of switches provided on the control panel.

Maintenance and abnormality control of goods entry and delivery equipment are also carried out.

7 Claims, 26 Drawing Sheets

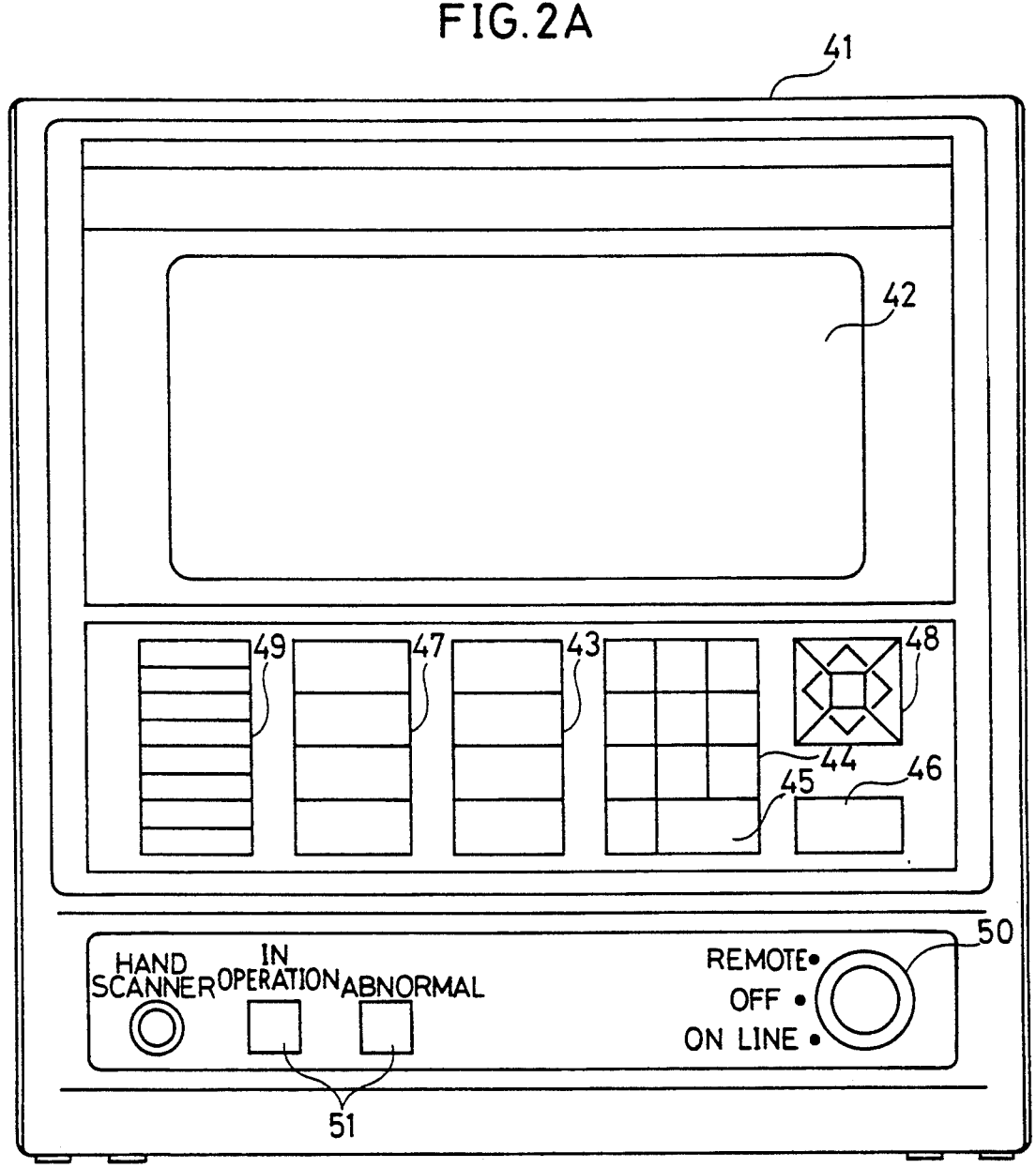

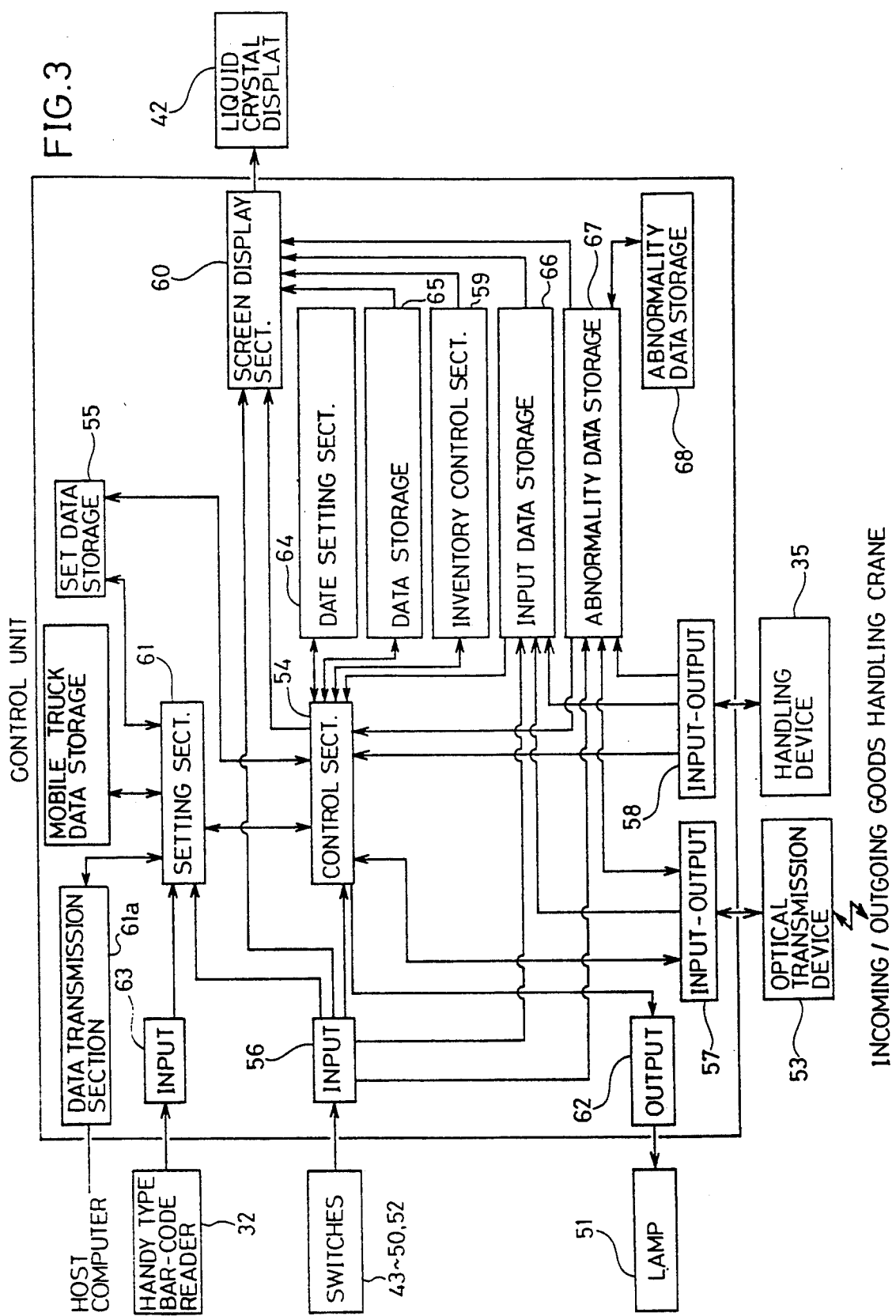

FIG.7

DISBURSEMENT SETTING

| ITEM No. | 1234 | OPERATION No. | * |
|---|---|---|---|
| MOBILE TRUCK | 2 | | |

| OPERATION No. | QUANTITY OF STOCK | ENTRY DATE |
|---|---|---|
| 1 | 1234 | 90 / 07 / 02 |
| 2 | 500 | 90 / 07 / 11 |
| ---- | ---- | ---- |
| 10 | 890 | 90 / 08 / 31 |

PICKING SETTING

| ITEM No. | 1234 | OPERATION No. | 1 |
|---|---|---|---|
| MOBILE TRUCK | 2 | QUANTITY OF DISBURSEMENT | * |
| OPERATION No. | QUANTITY OF STOCK | | ENTRY DATE |
| 1 | 1230 | | 90 / 07 / 02 |
| 2 | 500 | | 90 / 07 / 11 |
| ---------- | ---------- | | ---------- |
| 10 | 890 | | 90 / 08 / 31 |

FIG.9

REPLENISH ENTRY SETTING 42

| ITEM No. | 1234 | OPERATION No. | 1 |
|---|---|---|---|
| MOBILE TRUCK | 2 | AMOUNT OF REPLENISHMENT | * |
| OPERATION No. | QUANTITY OF STOCK | ENTRY DATE | |
| 1 | 1230 | 90 / 07 / 02 | |
| 2 | 500 | 90 / 07 / 11 | |
| ---------- | ---------- | ---------- | |
| 10 | 890 | 90 / 08 / 31 | |

FIG.10

| No. | TITLE | FUNCTION CALLING MENU |
|---|---|---|
| 1 | | |
| 2 | | |
| --- | --- | --- |
| 10 | MAINTENANCE JOB MENU | |
| 11 | SYSTEM MAINTENANCE MENU | |

MAINTENANCE JOB MENU

| No. | TITLE |
|---|---|
| 1 | INVENTORY MAINTENANCE |
| 2 | OPERATION RESULT |
| ------- | ------- |
| 5 | MOBILE TRUCK |
| 6 | TIME ADJUST |
| ------- | ------- |

FIG.12

INVENTORY MAINTENANCE

| ITEM No. | 1191 | OPERATION No. | 3 |
|---|---|---|---|
| NEW STOCK QUANTITY | * | | |

| OPERATION No. | QUANTITY OF STOCK |
|---|---|
| 1 | 2350 |
| 2 | 200 |
| ---------- | ---------- |
| 10 | 190 |

FIG.15

SYSTEM MAINTENANCE MENU

| No. | TITLE |
|---|---|
| 1 | ABNORMALITY HISTORY |
| 2 | OPERATION TIME |
| ---- | |
| 6 | BODY ABNORMALITY AGGREGATE |
| 7 | BODY INPUT SIGNAL |
| ---------- | |

FIG.17

OPERATION RESULT

| No. | OPERATION | ITEM No. | TRAY No. | QUANTITY | TIME |
|---|---|---|---|---|---|
| 1 | ENTRY | 1150 | 1 | 500 | 12:09 |
| 2 | PICKING | 1123 | 2 | 2310 | 12:15 |
| ------- | | | | | |
| 8 | DISBURSEMENT | 1910 | 3 | | 12:34 |
| ------- | | | | | |
| 15 | REPLENISH ENTRY | 1334 | 2 | 3230 | 13:24 |

FIG.18

ABNORMALITY HISTORY

| No. | TIME | CONTENT OF ABNORMALITY |
|---|---|---|
| 1 | 08/01  07:32 | GOODS IN DISORDER (OUT OF POSITION) |
| 2 | 08/02  09:02 | RUN COUNT ERROR |
| ------ | ------ | |
| 7 | 08/05  17:34 | DOUBLE STORAGE |
| ------ | ------------ | |

FIG.20

BODY ABNORMALITY AGGREGATE

| CAUSE | FRE-QUENCY | CAUSE | FRE-QUENCY |
|---|---|---|---|
| MOTOR OVERLOAD | 01 | LIFT INVERTER ABNORMAL | 02 |
| CHAIN CUT | 01 | LIFT ZONE ABNORMAL | 05 |
| ------- |  | ------- |  |

| ABNORMALITY : | PART A | |
|---|---|---|
| CODE : | | |
| FACTOR : | PART B | |
| ACTION : | | |
| RECOVERY PROCEDURE : | | |
| MODE | CONDITION | EXECUTION CANCELLED | ITEM No. |
| | ABNORMAL | | |

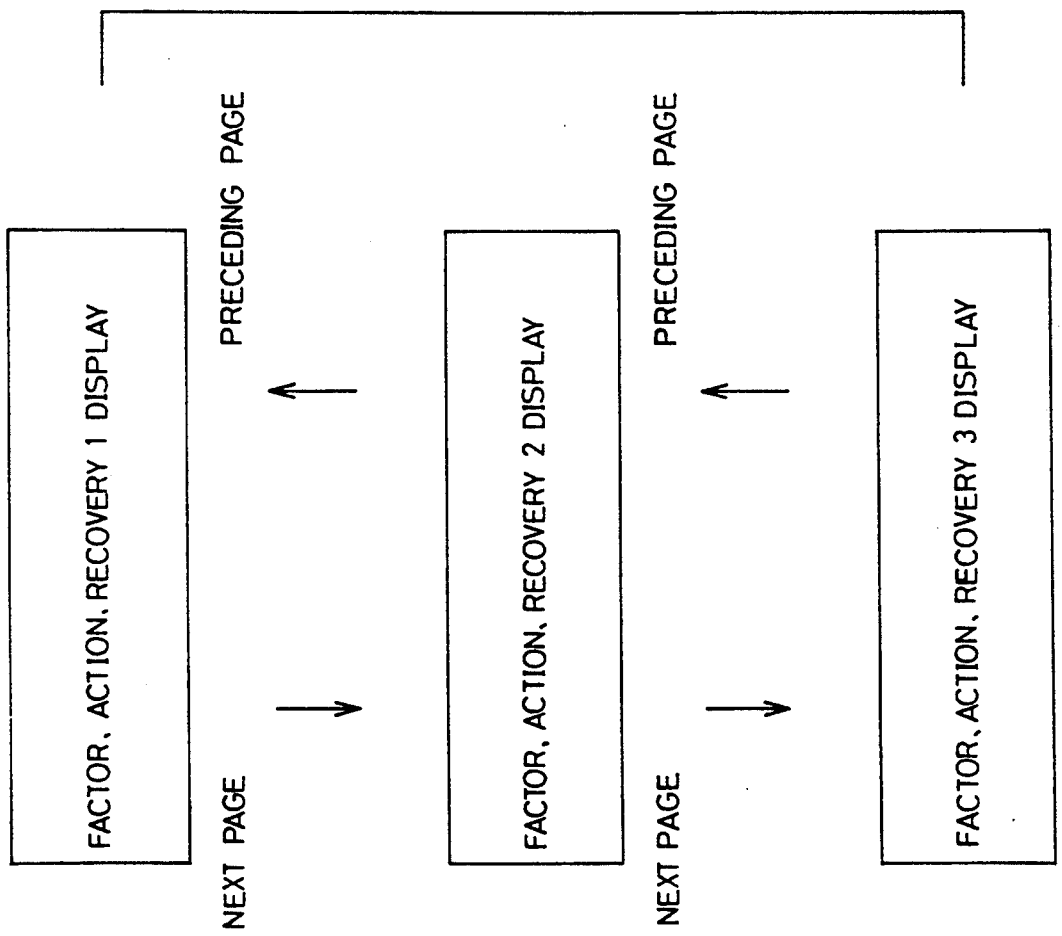

FIG.23A

ABNORMALITY: EMERGENCY STOP DUE TO PASSING BACKWARD LIMIT DURING BACKWARD MOVEMENT

CODE : 001

THERE ARE TWO POSSIBLE FACTORS FOR ABNORMALITY. CHECK "NEXT PAGE" AND "PRECEDING PAGE" TO DETERMINE THE CAUSE OF ABNORMALITY.
FACTOR 1: BRAKE DOES NOT FUNCTION PROPERLY BECAUSE THE CONDITION OF RUN BRAKE CIRCUIT IS ABNORMAL.
ACTION : TRY MANUAL DRIVE CONTROL TO CHECK TO SEE THAT THE BRAKE FUNCTIONS PROPERLY.
RECOVERY PROCEDURE :
: SWITCH CRANE OPERATION TO MANUAL MODE.
: REMOVE MAINTENANCE UNIT, AND ADVANCE TO TERMINAL LIMIT WHILE PUSHING INTERLOCK RELEASE BUTTON.
: AFTER THIS MOVEMENT, SWITCH CRANE OPERATION TO AUTOMATIC MODE.
: PUSH "ABNORMALITY RELEASE" ON RMC, THEN PUSH "ACTIVATE", AND CRANE WILL BE REACTIVATED.

| MODE | CONDITION | EXECUTION CANCELLED | | ITEM No. |
|---|---|---|---|---|
| ON-LINE | ABNORMAL | GOODS-IN | 02→01-035-05 UNLOAD | 1238 |

FIG. 23B

ABNORMALITY : EMERGENCY STOP DUE TO PASSING BACKWARD LIMIT DURING BACKWARD MOVEMENT

CODE : 001

THERE ARE TWO POSSIBLE FACTORS FOR ABNORMALITY. CHECK "NEXT PAGE" AND "PRECEDING PAGE" TO DETERMINE THE CAUSE OF ABNORMALITY.
FACTOR 2 : RUN WHEELS HAVE SLIPPED ON THE RAIL BECAUSE OIL OR THE LIKE IS PRESENT ON THE WHEELS OR RAIL.
ACTION : REMOVE OIL OR THE LIKE PRESENT ON THE WHEELS OR RAIL. FIND OUT THE CAUSE OF THE DEPOSITION OF OIL OR THE LIKE, AND CORRECT THE SITUATION.
RECOVERY PROCEDURE :
 : SWITCH CRANE OPERATION TO MANUAL MODE.
 : REMOVE MAINTENANCE UNIT, AND ADVANCE TO TERMINAL LIMIT WHILE PUSHING INTERLOCK RELEASE BUTTON.
 : AFTER THIS MOVEMENT, SWITCH CRANE OPERATION TO AUTOMATIC MODE.
 : PUSH "ABNORMALITY RELEASE" ON RMC, THEN PUSH "ACTIVATE", AND CRANE WILL BE REACTIVATED.

| MODE | CONDITION | EXECUTION CANCELLED | ITEM No. |
|---|---|---|---|
| ON-LINE | ABNORMAL | GOODS-IN  02→01-035-05  UNLOAD | 1238 |

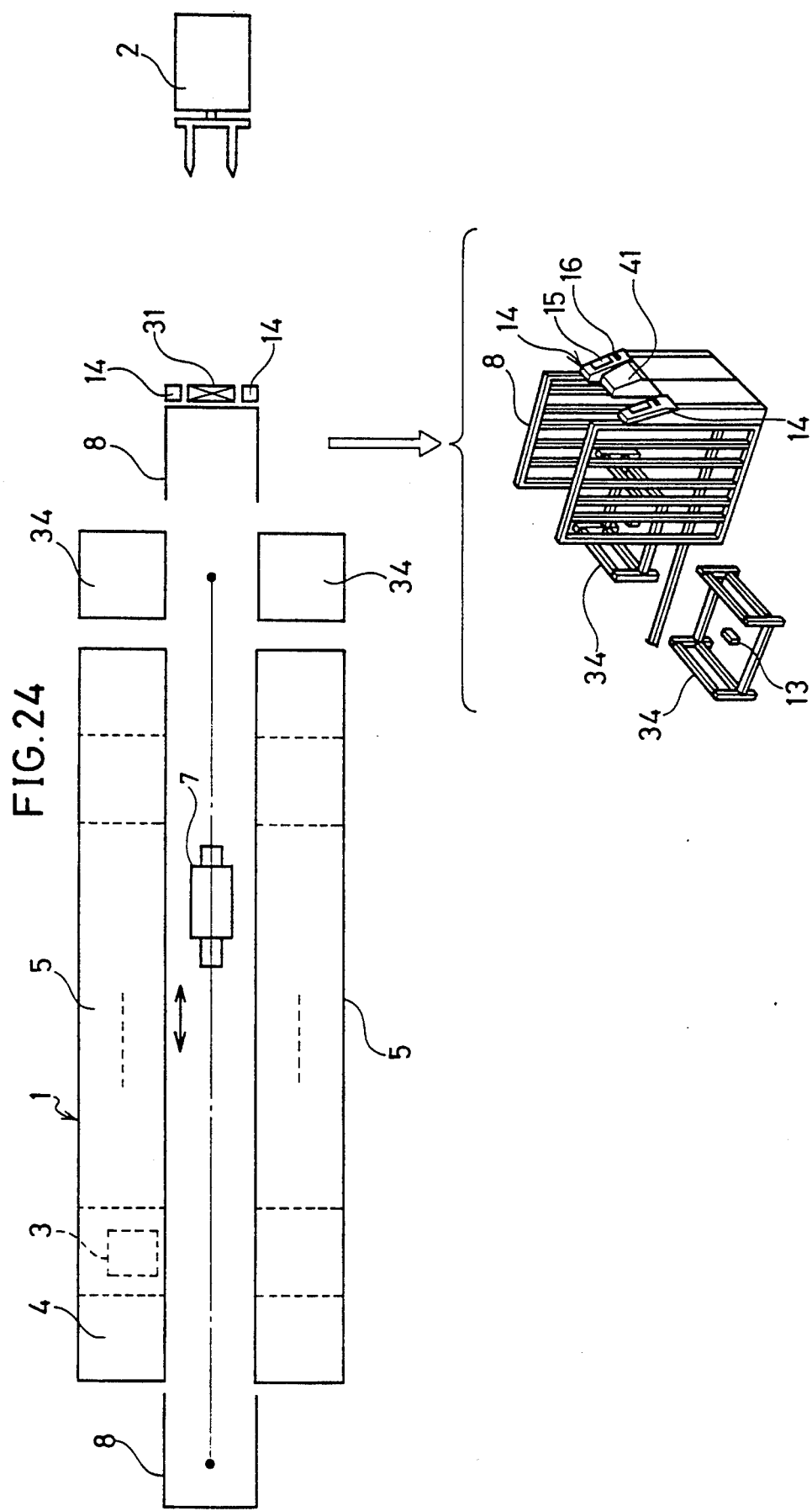

CONTROL SYSTEM FOR AUTOMATIC WAREHOUSING FACILITY

This is a continuation of copending application Ser. No. 07/721,124 filed on Jun. 26, 1991, abandoned.

FIELD OF THE INVENTION

The present invention relates to a control system for an automatic warehousing facility.

BACKGROUND OF THE INVENTION

Automatic warehousing facilities are known of the type which includes racks capable of storing goods in plural lots, an incoming and outgoing goods handling device, such as a crane, for conveying goods to and from the racks, and a control panel disposed on the ground side for controlling the operation of the incoming and outgoing goods handling device. In such automatic warehousing facility, there is provided a control sheet of paper form or the like for inventory control purposes, which control sheet is used by an operator in the warehouse for inventory management.

Accordingly, the operator is required to make necessary entries and/or cancellations by hand in the control sheet with respect to quantities of goods handled in each incoming and/or outgoing goods handling operation.

In such known automatic warehousing facility, it is also necessary that the operator must make entry in a necessary format or the like by hand of various datas, including the date of receipt or disbursement of goods, history of the goods received or disbursed, and abnormal occurrences encounted with the goods in the past.

Such known automatic warehousing facility involves another problem that an operator who is operating the control panel cannot visually check the operating condition of the crane or the like incoming and outgoing goods handling device and, therefore, that if some trouble or abnormal condition has occurred with the incoming and outgoing goods handling device in operation, no quick action may be taken to correct the trouble, which would result in considerable inconvenience from the standpoint of maintenance. In the case where such abnormality should occur, it has been usual practice that the operator initially refers to the operation manual or operation instructions to find out the possible cause of the abnormality and how to cope with the trouble before he can start a corrective action, it being thus impossible to take any corrective action in a quick and proper manner.

SUMMARY OF THE INVENTION

Accordingly, it is a primary object of the invention to eliminate all these problems in the prior art.

It is another object of the invention to enable management to be carried out with respect to receipt and disbursement of goods without requiring the operator to produce data by hand.

It is a further object of the invention to make it possible to take prompt action to correct any trouble which may occur with the incoming and outgoing goods handling device.

In order to accomplish these objects, according to the invention there is provided a control system for an automatic warehousing facility comprising:

racks capable of storing goods in plural lots, an incoming and outgoing goods handling device for handling incoming goods to be stored in the racks and outgoing goods to be withdrawn from the racks, a control panel disposed on the ground side for operatively controlling the incoming and outgoing goods handling device so as to control receipt and withdrawal of goods, said control panel having means for effecting visual display on a screen, and means provided in the control panel for carrying out inventory management of the goods and/or maintenance and abnormality control of the incoming and outgoing goods handling device.

According to such arrangement, the operator can carry out inventory control of goods by manipulating the control means, without being required to make an entry by hand in a paper format. Further, by virtue of the control means which enables the operator to perform maintenance and abnormality control, greater ease of maintenance is provided, and quick action can be taken to correct any abnormal condition if such occurs.

BRIEF DESCRIPTION OF THE DRAWINGS

FIGS. 2A and 2B are enlarged views showing a control panel in FIG. 1;

FIG. 3 is a block diagram showing a control device according to one embodiment of the invention;

FIGS. 5,6,7,8,9,10,11,12,13,14,15,16,17,18,19,20,21,22,23A, and 23B, inclusive, are views showing various representations displayed on the display screen of the control panel;

FIG. 24 is a general plan view of an automatic warehousing facility according to one embodiment of the invention.

DESCRIPTION OF THE PREFERRED EMBODIMENTS

Figure 1:
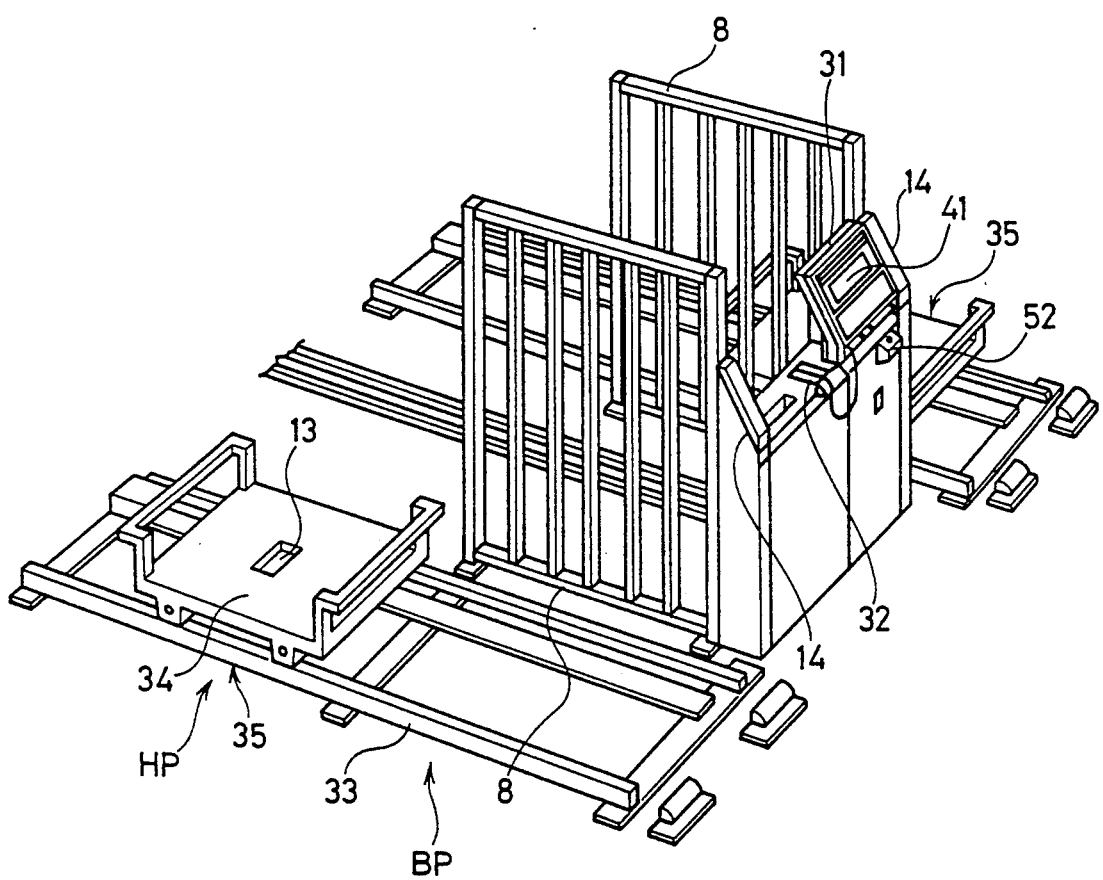
FIG. 1 is a schematic external view of a control device for an automatic warehousing facility according to one embodiment of the present invention.

In FIG. 24, an automatic warehousing facility in accordance with the present invention, designated generally by reference numeral 1, includes racks 5 defining a plurality of spaces 4 for storing goods 3, a crane 7 movable horizontally along the racks 5 and operative as an incoming and outgoing goods handling device for handling goods 3 for storage in and withdrawal from the racks 5, and a control device 31 disposed on the ground side for controlling the crane 7 through signals issued to and received from the crane 7 via an optical transmission system (not shown). This control device 31 is disposed at one terminal side of a travel path for the crane 7 which is positioned away from the racks 5. At opposite terminal sides of the travel path there are provided separate fences 8 intended for safeguarding the operator. Operator units 14 are disposed at both sides of the control unit 31. The operator units 14 each have a lamp 15 indicative of the mode of operation, and an ending switch 16 for supplying to the control unit 31 an indication that one cycle of operation has been completed, by being manipulated by the operator upon completion of the cycle. Disposed adjacent the control unit 31 are mobile trucks 34 which are each adapted to deliver goods 3 to the crane 7 and receive goods 3 from the crane 7. Similarly, each mobile truck 34 is adapted to deliver goods 3 to a fork lift truck 2 or loading and unloading truck and receive goods 3 from the fork lift truck 2.

As FIG. 1 shows, the control unit 31 is equipped with a handy-type bar code reader (hereinafter referred to as "scanner") 32. Shown by 35 is a handling unit which includes one of the mobile truck 34. Each mobile truck 34 travels to carry goods 3 on a predetermined track 33 between a receipt and withdrawal position HP at which delivery of goods 3 to and from the crane 7 is effected and a loading and unloading position BP at which delivery of goods to and from the fork lift truck 2 is effected. The mobile truck 34 is equipped with a goods sensor 13 consisting of a reflective-type photoelectric switch for contactlessly detecting goods 3 placed on the truck 34.

Figure 2B:
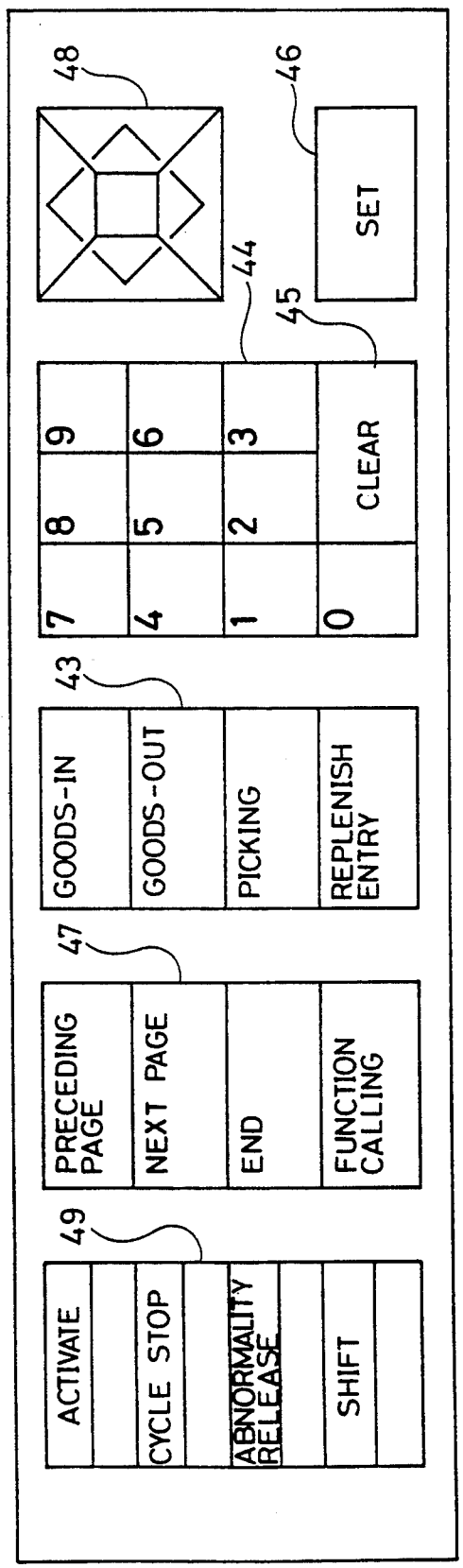

The control unit 31 includes a control panel 41. As shown in FIG. 2, the control panel 41 is equipped with a liquid crystal cost time display unit 42 which displays types of operation modes, such as goods receiving and goods withdrawal, and/or any trouble caused to the crane 7. Reference numeral 43 designates an operation mode setting switch which may be used in the case of manual operation mode in which no scanner 32 is employed. The control panel 41 has ten key switches 44, a clear switch 45, a set switch 46, and control switches 49 for starting, cycle ending, abnormality removal, and shifting. Reference numeral 47 designate a screen display switch which is used for screen display setting when the operator interacts with the liquid crystal display unit 42; and the switch 47 includes functional calling, paging switches, etc. Reference numeral 48 designates a cursor moving switch. A key switch 50 is used for selection of one of the following modes: "remote mode" which is to be set on the control panel 41; "on-line-mode" which is to be set by a setting signal from a host computer; and "off mode" in which no automatic warehousing facility is used. Shown by 51 is an indicator lamp which is lighted to indicate "in operation", and "abnormal". As FIG. 1 shows, an emergency stop switch 52 is provided beneath the control panel 41. These pieces of equipment are connected to the control device 31 as shown in FIG. 3.

The construction of the control device 31 will be explained in detail with reference to the block diagram shown in FIG. 3.

A set data memory 55 has a number of preset work data stored therein including operation modes, name and/or item number of goods 3, and quantity of goods 3. A control section 54 can receive relevant condition detection data from the crane 7 via input and output 57 and optical transmission device 53, and from the handling unit 35 via input and output 58. Such relevant condition detection data 7 include, for example, data concerning the condition of the crane 7, data as to the presence or absence of goods 3 on the selfmoving truck 34 which may be received from the goods sensor 34 of the truck 34, and work completion data from the ending switch 16 manipulated at the end of each cycle.

The control section 54 fetches in sequential order a plurality of work data preset by the set data memory 55 and, when the on-line mode has been selected by the key switch 50, the control section 54 directly controls both the crane 7 and the handling unit 35, and when the remote mode has been selected, the control section 54, in response to control signals received from the switches 49, 52 via input 56 and on the basis of the relevant condition detection data as received in the above stated manner, controls the crane 7 through input and output 57 and optical transmission device 53, and the handling unit 35 through input and output 58. Further, the control section 54 controls the indicator lamp 51 through an output 62. When incoming operation mode has been selected by key switch 50, information on the name of goods 3, and quantity of goods 3 for each item number, is supplied to inventory control 59. When outgoing operation mode has been selected, the quantity of goods 3 stored according to the name and/or item number inputted is retrieved and, quantity and other relevant data on the retrieved goods 3 are erased upon completion of the outgoing operation.

The control section 54 outputs to data storage 65 goods-in date data with date data received from data setting section 64, and erases the goods-in date data which has previously been stored, at end of delivery operation. Each goods-in date data comprises work number for each name of goods 3 or item number, quantity of goods 3, and date of receipt, which data are formed and stored by control section 54 in incoming operation mode and are erased at end of outgoing operation, as stated above. Date setting section 64 has a calendar function, outputs date data to control section 54, and sets timing according to a signal from control section 54.

The control unit 31 has input data storage 66 which stores all such data received as stated above.

The control section 54 outputs collected performance data to data storage 65. Each collected performance data comprises operation data including operation mode, name and/or item number of goods 3, quantity of goods 3, and identification number of handling device 35; input status detection data concerning abnormality detection data in particular; and time data including executed operation time (time taken), operation time of crane 7, and time required for lifting and travel of crane 7, and deliver of goods. These datas are individually stored, as actual operation results, abnormality history, and automatic warehousing actual used time, in corresponding areas of data storage 65, along with relevant transaction times.

Reference numeral 67 designates abnormality control section which can input abnormality codes with respect to crane 7 through input and output sections 57, 58 from control unit and/or handling device 35. Abnormality data storage 68 is connected to the abnormality control section 67 in which are previously stored abnormality content, abnormality factor, method of handling, and correction method as abnormality message data for each abnormality code. The abnormality control section 67 retrieves abnormality data storage 68 according to the abnormality code received, and outputs the corresponding abnormality message date to screen display section 60 until the abnormality code disappears. The screen display section 60, in accordance with the prescribed language format, always outputs operation data received from the control section 54 to liquid crystal display unit 42 for display, and also outputs the abnormality message data received from the abnormality control section 67 for display, in preference to the data received at time of setting from setting section 61.

Reference numeral 61 designates setting section which, when online mode is selected by key switch 50, enters operation dates from host computer sequentially into setting data storage 61a through data transmission section 61a. When remote mode is selected by key switch 50, the setting section 61 enters operation datas corresponding to control signals from switches 43–46 and/or signals scanner 32 into the setting data storage 55 through inputs 56, 63.

Reference numeral 60 designates screen display section which, in accordance with an operation mode signal and/or screen setting signal received from control panel 41 through input 56, edits various datas, such as mode screen data, data for function calling menu, and inventory control data stored in inventory control section 59, according to the prescribed language format which has been previously stored, and outputs such data to the liquid crystal display unit 42 for display.

According to the above described arrangement, the control unit 31 controls handling devices 35 in response to operation data from host computer, control signals from switches 43-50, 52, and input signals form scanner 32, and performs incoming and outgoing transactions with respect to goods 3 by controlling the crane 7 and mobile trucks 34 through optical transmission 53. The control unit 31 also causes display units 42, 51 to perform necessary display. In case where emergency stop switch 52 is manipulated during incoming and outgoing operations, or where a trouble has accurred with handling device 35 or crane 7, the control unit 31 stops all controls. In the event of any trouble or failure, the liquid crystal display unit 42 is caused to display the content of the trouble until the trouble has been corrected.

Figure 4:
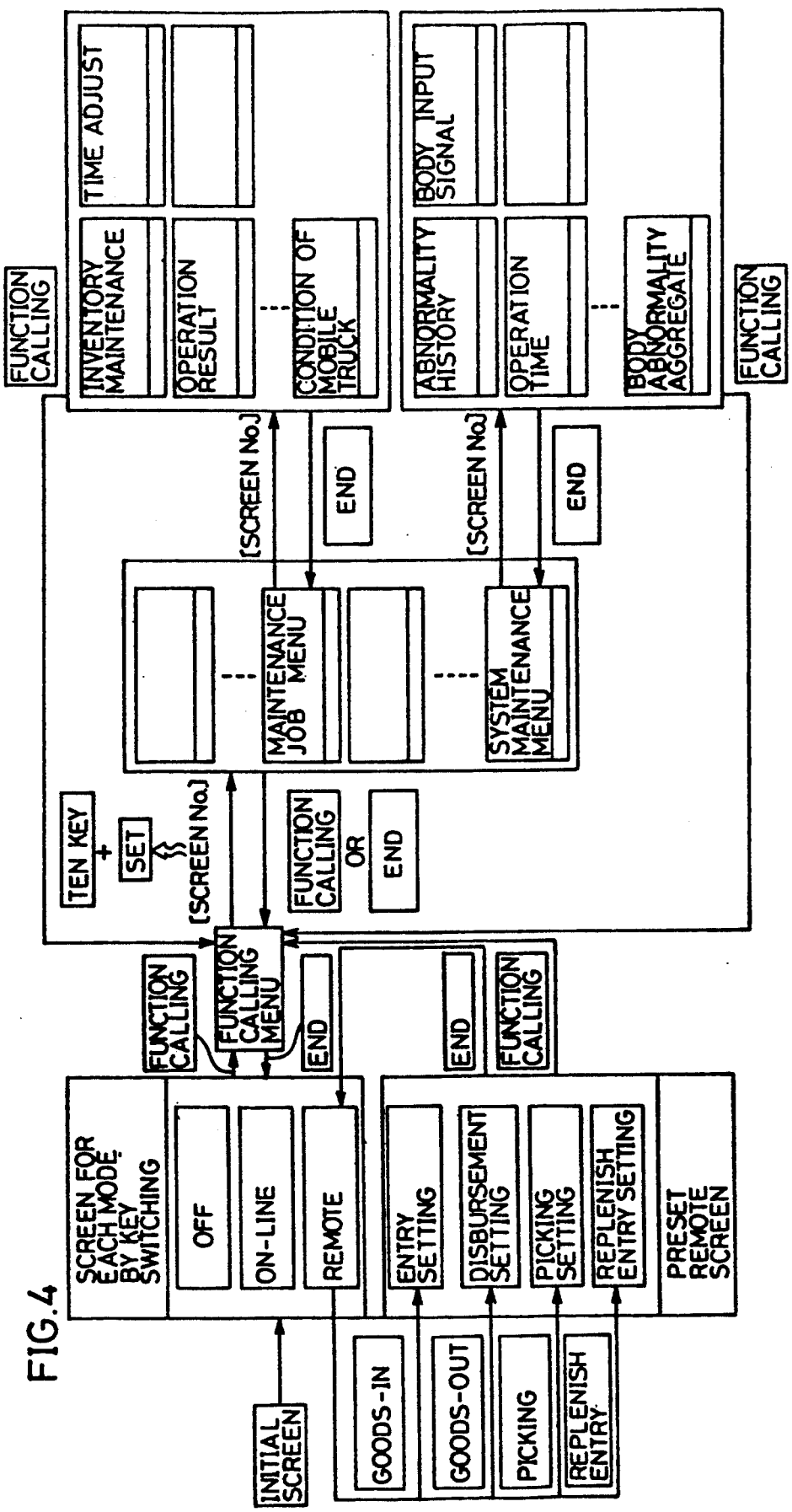
FIG. 4 is a view showing a control procedure for the automatic warehousing facility, as seen on the control panel.

The procedure for display on the liquid crystal display unit 42 by the screen display section 60 of the control unit 31 with respect to inventory control data stored in the inventory control section 59 will now be explained in detail with reference to a screen control procedure chart shown in FIG. 4 and screen representations shown in FIGS. 5 to 12.

Figure 5:
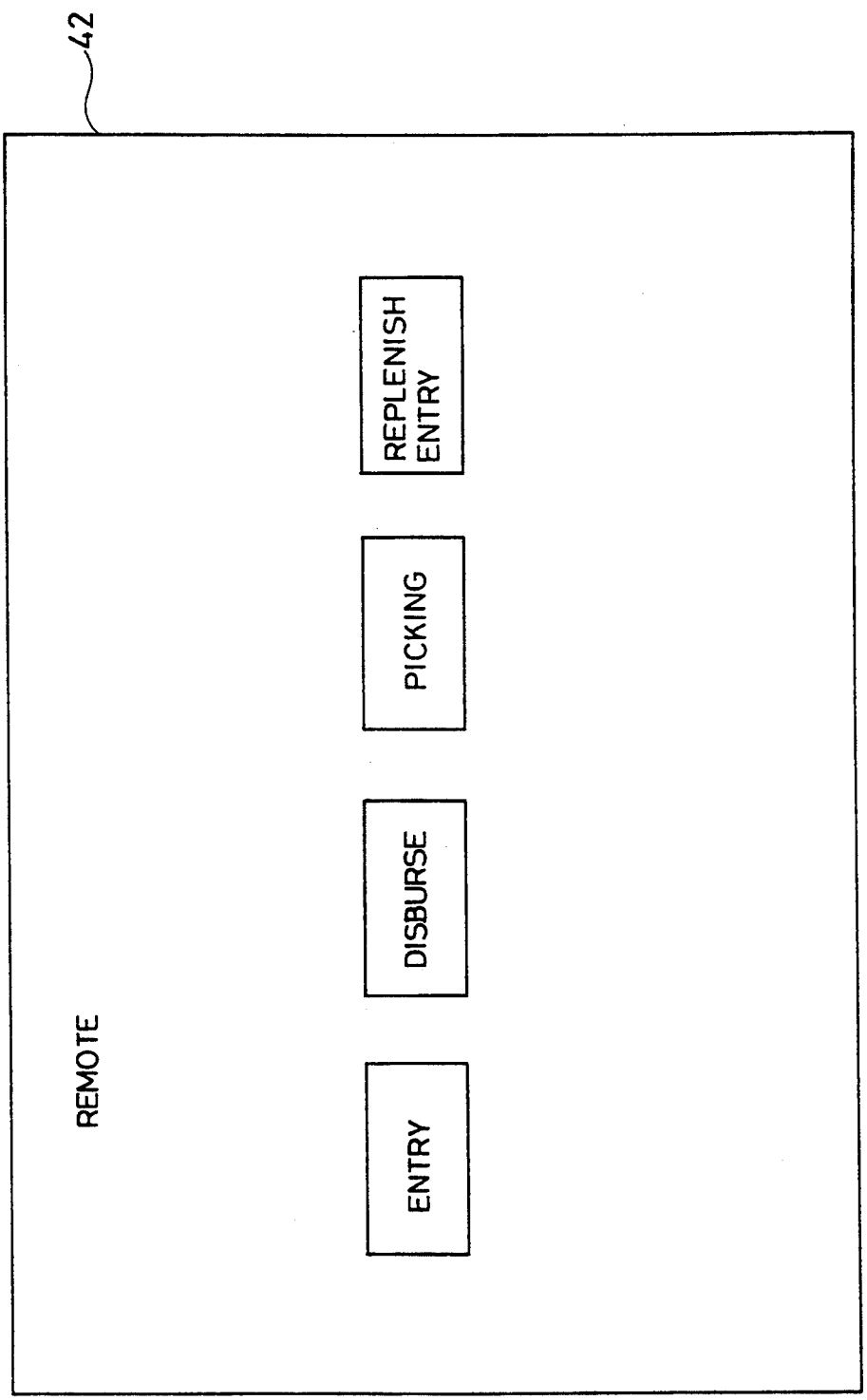
Figure 6:
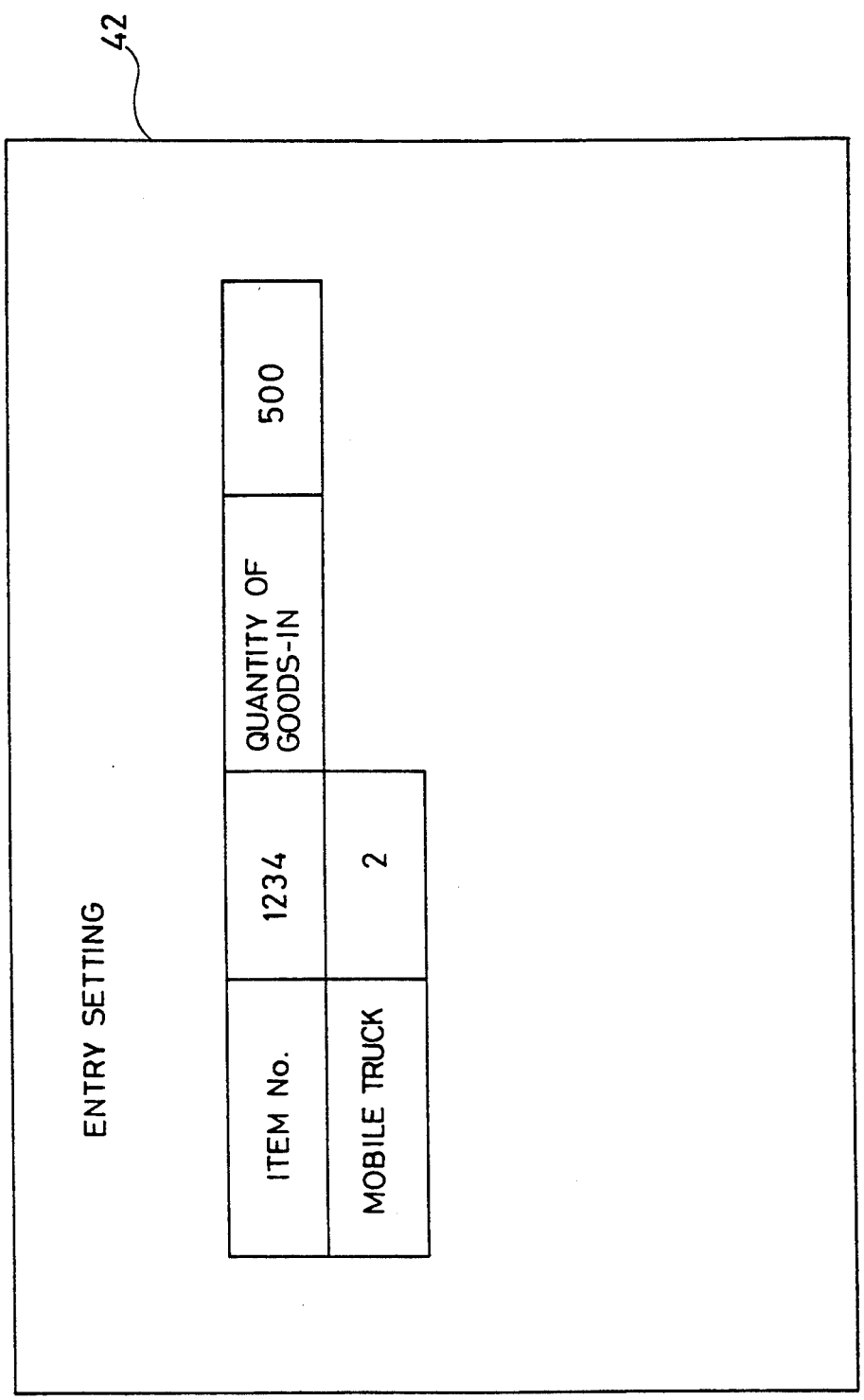

Initially, remote mode is selected by key switch 50 and a remote screen as shown in FIG. 5 is displayed on the liquid crystal display unit 42. The remote screen indicates names of operation modes, such as incoming, outgoing, picking, and replenish entry, one of which mode may be set. When the operator, at sight of the remote screen, sets "incoming mode", for example, by operation mode setting switch 43, incoming operation setting screen, as shown in FIG. 6, is displayed. The incoming operation setting screen comprises item number of goods 3, incoming quantity, and machine number of mobile truck 34 (or handling device 35). Data for these items, which are inputted using ten key switch 44, clear switch 45, and set switch 46, or scanner 32, are displayed on the screen. Then, the control section 54 produces inventory control data by adding operation number to incoming quantity for item number of goods 3 inputted, causes the inventory control data to be stored in the inventory control section 59.

Subsequently, when "end" is selected by screen setting switch 47, a remote screen as shown in FIG. 5 is displayed. Then, if the operator, at sight of the remote screen, sets "outgoing mode", for example, by operation mode setting switch 43, an outgoing setting screen as shown in FIG. 7 is displayed.

The outgoing setting screen comprises item number of goods 3, incoming quantity, and machine number of mobile truck 34 (or handling device 35). When item number of goods 3 is inputted using ten key switch 44, clear switch 45, and set switch 46, or scanner 32, the inventory control data stored in the inventory control section 59 is retrieved on the basis of the item number, and a list including the operation number, quantity in stock, and entry date is displayed. Simultaneously, the item number of goods 3, operation number, and number of goods receiving tray are also displayed. At end of outgoing operation, the control section 54 erases the quantity of stock disbursed corresponding to the operation number.

Similarly, later when "end" is selected by screen setting switch 47, the remote screen shown in FIG. 5 is displayed; and when the operator selects "picking" by operation mode setting switch 43, a picking setting screen as shown in FIG. 8 is displayed.

The picking setting screen comprises item number of goods 3, operation number, machine number of mobile truck 34 (or handling device 35), and paid-out quantity of goods 3. In same manner as in the case of "outgoing mode", item number of goods 3 is inputted, inventory control data is retrieved, and a prescribed list is displayed. At same time, item number of goods 3 inputted, operation number, number of goods tray, and quantity paid out are displayed. In this case, the control section 54 subtracts the paid out quantity from the quantity of stock corresponding to the operation number which is specified at the end of the picking operation, and restores the result in the inventory control section 59.

Similarly, if "end" is selected by screen setting switch 47 and "replenish entry mode" is set, then a replenish entry setting screen as shown in FIG. 9 is displayed.

The replenish entry setting screen comprises item number of goods 3, operation number, machine number of mobile truck 34 (or handling device 35), and quantity of goods 3 for replenishment. Likewise, when item number of goods 3 is inputted, the inventory control data stored in the inventory control section 59 is retrieved according to the item number, and a prescribed list is displayed. At same time, item number of goods 3 inputted, operation number, number of goods receiving tray, and quantity for replenishment are displayed. In this case, the control section 54, at the end of replenish entry operation, adds the quantity of replenishment to the stock quantity corresponding to the specified operation number, and causes the result to be restored in the inventory control section 59.

Figure 13:
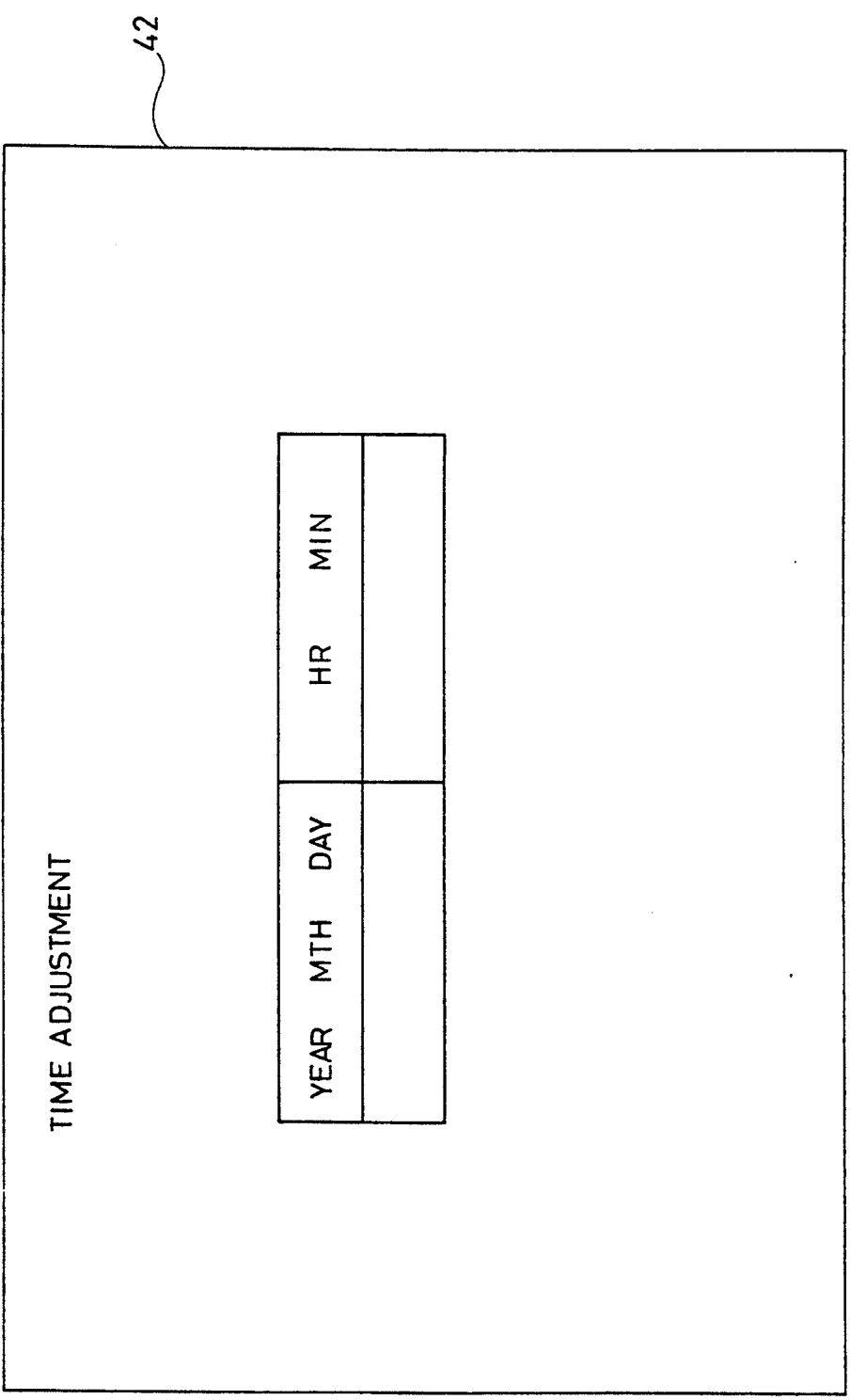

When "function calling" is selected by screen setting switch 47, a function calling menu as shown in FIG. 10 is displayed. Then, for example, number "10" for "maintenance job menu" is inputted by ten key switch 44 and, in turn, set switch 46 is manipulated, whereupon a maintenance job menu as shown in FIG. 11 is displayed. Then, assume, for example, number "1" for "inventory maintenance" is inputted by ten key switch 44 and, in turn, set switch 46 is manipulated. Then, an inventory maintenance screen as shown in FIG. 13 is displayed.

The inventory maintenance screen comprises item number of goods 3, operation number, and new quantity of inventory. In same manner as above, item number of goods 3 is inputted. Then, on the basis of the item number, the inventory control data stored in the inventory control section 59 is retrieved, and a list comprising operation number and quantity of stock is displayed. At same time, inputted item number of goods 3, operation number, and new quantity of stock are displayed. The control section 54 causes the quantity of stock corresponding to the specified operation number to be replaced by new quantity of stock, which is restored in the inventory control section 59 accordingly. In this manner, the stock quantity data in the inventory control section 59 can be updated.

In this way, the operator inputs operation data in interactive relation with the screen, whereby if operation mode is "incoming mode", quantity of stock is stored for each item number or name of goods inputted, while if operation mode is "outgoing mode", the inventory control data for each item number or name of goods inputted is displayed on the liquid crystal display unit 42 according to a preset format. Thus, it is possible to determine, at the time of outgoing goods handling, whether the goods is in stock or not, and to carry out inventory control by updating the quantity of stock at the end of operation. Since inventory management is automatically performed, it is no longer necessary for the operator to write down quantity in a control sheet or erase it by hand. Therefore, considerable improvement can be obtained in operating efficiency.

The procedure for display on the liquid crystal display unit 42 through screen display section 60 with respect to entry date data stored in the data storage 65 of the control unit 31 will be explained below.

When an entry setting screen as shown in FIG. 6 is displayed and operation data is inputted, the control section 54 produces entry date data by adding date data received from date setting section 64 to the input operation data, and causes such entry data data to be stored in the data storage section 59 for each item number of goods 3.

When a delivery setting screen as shown in FIG. 7 is displayed, item number of goods 3 is inputted. Then, on the basis of the item number, the entry date data stored in the date storage 59 are retrieved, and entry dates are displayed. Likewise, entry dates are displayed on a picking setting screen as shown in FIG. 8 and a replenish entry setting screen as shown in FIG. 9.

Referring to the maintenance job menu shown in FIG. 11, when number "1" for "timing" is inputted and, in turn, set switch 46 is manipulated, a time adjust screen as shown in FIG. 13 is displayed. The time adjust screen includes a year-month-day column and an hour-minute column and displays year-month-day data and hour-minute data inputted by using switches 44-46.

For time adjustment of the date setting section 64, year-month-day data for time adjustment is first inputted by ten key switch 44 and then set switch 46 is manipulated, whereupon the control section 54 outputs the year-month-day data to the date setting section 64 for year-month-day data adjustment. Again, hour-minute data is inputted and, in turn, set switch 46 is manipulated, whereupon the control section 54 outputs the hour-minute data to date setting section 64 for time-minute data adjustment.

In the case of incoming mode, date data is stored for each item number or name of goods inputted. In the case of outgoing mode, the entry date data stored is displayed on the liquid crystal display unit 42 according to a preset format, whereby the entry date can be acknowledged at the time of outgoing delivery. This enables first-in and first-out of goods. Since entry dates are automatically registered, it is no longer necessary for the operator to make date control, which contributes toward operating efficiency improvement.

The procedure for display on the liquid crystal display 42 through the screen display section 60 of the control unit 31 with respect to the status of crane 7 and handling devices 35.

Figure 14:

When the maintenance job menu shown in FIG. 11 is on display, number "5" for "mobile truck condition" is inputted by ten key switch 44 and, in turn, set switch 46 is manipulated, whereupon the condition of a first mobile truck 34 as shown in FIG. 14 is displayed. On this display screen are displayed presence or non-presence of goods on the mobile truck 34(if present, ON), control being executed by the control unit 31 with respect to the handling device 35 (e.g., "under maintenance"), etc. in ordinary language.

When "next page" is operated by screen setting switch 47, the condition of a second mobile truck is displayed, and when "preceding page" is operated by screen setting switch 47, the condition of a first moble truck is displayed.

Nwxtly, when "end" is selected by the screen setting switch 47, the screen goes back to the maintenance job menu shown in FIG. 11 for display, and then if "end" is selected by the screen setting switch 47, the screen goes back to the function calling menu shown in FIG. 10 for display.

Figure 16:
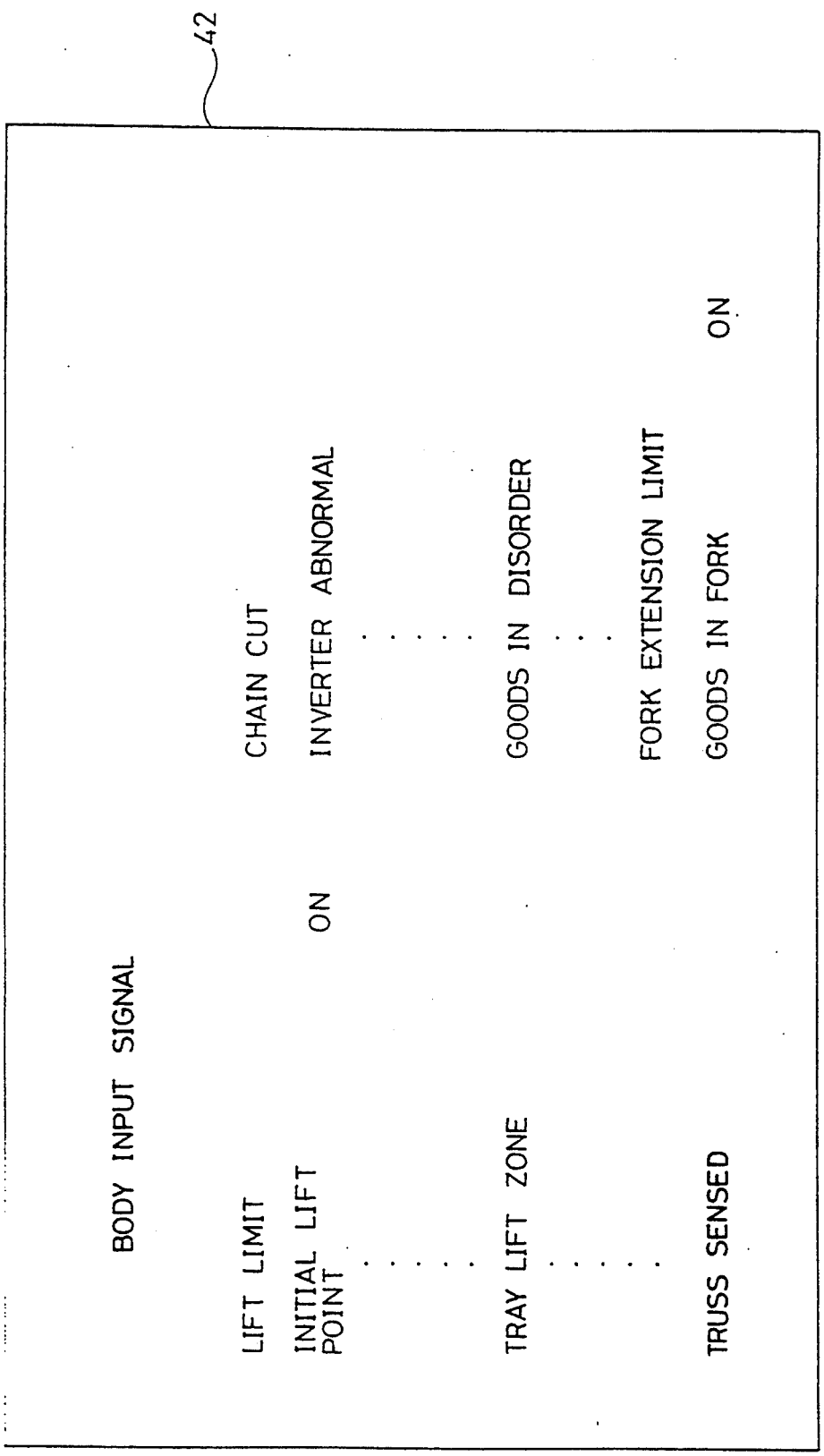

In this condition, if number "11" for "system maintenance menu" is inputted by ten key switch 44 and, in turn, set switch 46 is manipulated, the system maintenance menu shown in FIG. 15 is displayed. In this condition, if number "7" for "body input signal" is inputted by ten key switch 44 and, in tun, set switch 46 is manipulated, a screen for body input signals as shown in FIG. 16 is displayed.

On the body input signal screen are displayed status data on crane 7 which are received from the crane 7 through the optical transmission unit 53, namely, on/off condition of sensor on the crane 7, condition of its fork (e.g., stretch and retract condition), etc. in ordinary language and not in the form of device number or the like.

It is noted here that if "next page" or "preceding page" is operated by screen setting switch 47, condition of other body input signals is displayed.

When "end" is selected by screen setting switch 47, original menu is displayed.

Through such control of operation by the operator on an interactive basis relative to the screen, condition of handling device 35 and condition of crane 7 are displayed in ordinary language. Therefore, the operator can determine the condition of the automatic warehousing facility as a whole on the control panel, and thus can easily and quickly respond to maintenance needs and act against possible abnormality occurrences, which will naturally lead to improved operating efficiency.

The procedure for display on the liquid crystal display unit 42 through the screen display section 60 of the control unit 31 with respect to the condition of crane 7 and handling device 35 will be explained herein below.

When the maintenance job menu shown in FIG. 11 is on display, number "2" for "operation result" is inputted by ten key switch 44 and, in turn, set switch 46 is manipulated, whereupon an "operation result" screen as shown in FIG. 17 is displayed. On this operation result screen are displayed operation data stored as operation results in the data storage 65, in ordinary language in order of entry according to the preset format, and on the following items: "serial number", "operation mode", "item number of goods 3", "machine number of mobile truck", "quantity of goods 3", and "time executed".

When screen setting switch 47 is manipulated for "next page", a screen for operation results of a next serial number is displayed and when same switch is manipulated for "preceding page", a screen for operation results of the preceding serial number is displayed.

When the system maintenance menu shown in FIG. 15 is on display instead of the above, if number "1" for "abnormality history" is inputted and, in turn, set switch 46 is manipulated, an "abnormality history" screen a shown in FIG. 18 is displayed. 3n this "abnormality history" screen are displayed abnormality detection data stored as abnormality history in the date storage 65, in ordinary language in order of entry, according to the preset format, and on the following items: "serial number", "time of occurrence", and "abnormality".

When screen setting switch 47 is manipulated for "next page", abnormality history corresponding to the next serial number is displayed, and when same switch is manipulated for "preceding page", abnormality history corresponding to preceding serial number is displayed.

Figure 19:
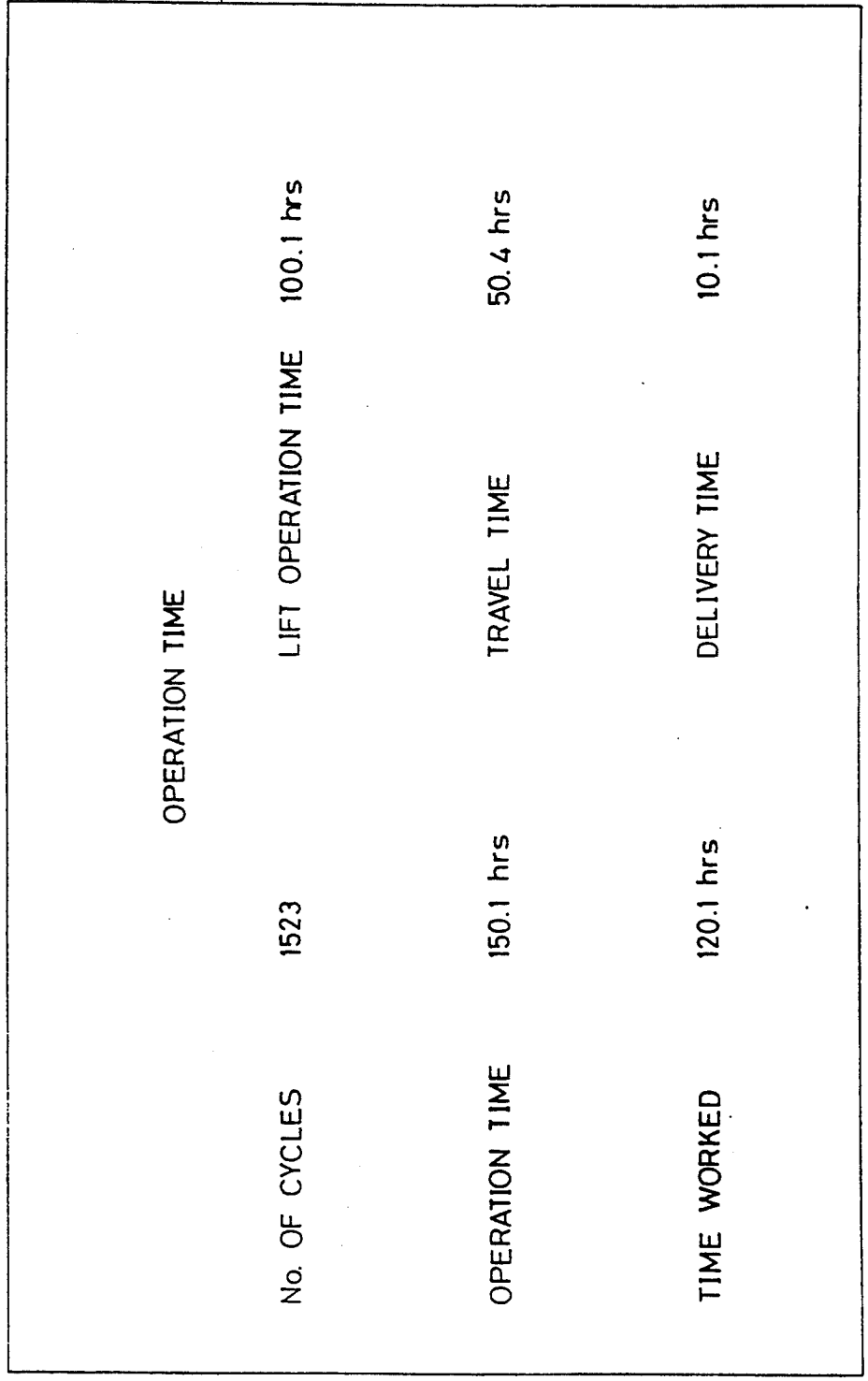

When, on the system maintenance menue shown in FIG. 15, number "2" for "operation time" is selected, a screen for "operation time" as shown in FIG. 19 is displayed. On this operation time screen are displayed, in terms of time added with data stored as actual time in automatic warehousing which are stored in the data storage 65, "number of cycles (cycles worked), "operation time", "time worked", "lift operation time" of crane 7, "travel time" of crane, and "delivery time" for crane, in that order, according to the preset format and in ordinary language.

When number "6" for "cumulative body abnormality" is selected on the system maintenance menu shown in FIG. 15, a "cumulative body abnormality" screen shown in FIG. 20 is displayed. On this body abnormality screen are displayed abnormality detection data stored as abnormality history in the data memory storage 65 and aggregated for each cause of abnormality, according to a preset format and in the order of "cause of abnormality" and "abnormality occurrence times", in ordinary language.

When screen setting switch is manipulated for "next page" and/or "preceding page", other "cumulative body abnormality" data are displayed.

Through such interactive control of operation relative to the screen as stated above, various datas, such as automatic warehousing operation result, abnormality history, operation time, and cumulative body abnormality, are displayed in ordinary language. Therefore, the operator can recognize past operation data from "operation result", and contents of past abnormality occurrences from "abnormality history", which enable the operator to accurately cope with causes of abnormality in the process of maintenance. It is also possible to make decision as to timing for run drive mechanism, running wheels, lift drive mechanism, and lift chain, from "operation time". It is also possible to properly preset, for maintenance purposes, items for replacement and items of inspection with respect to parts.

Nextly, the manner of operation for display of description of abnormality, factor of abnormality, and corrective measures, through the abnormality control section 67 of the control unit 31 and the display screen of the liquid display device 42 will be explained.

If abnormality should occur with respect to crane 7 or handling device 35, an abnormality code issued from the crane 7 or handling device 35 is inputted to the control section 54 through the optical transmission unit 53, and input and output 57, 58. The control section 54, when it receives an abnormality code, responds to the abnormality code to retrieve abnormality message data (description of abnormality, responsible factor, corrective measure, and mothod of recovery) stored in the abnormality data storage 33 and output same. The control section 54 causes the crystal display unit 42, by interruption, to display the abnormality message date in place of ordinary opeation screen.

The format of the screen displaying the abnormality message data is shown in FIG. 21. In part A at an upper side of the screen, the content of abnormality and abnormality code are displayed until the abnormality at crane 7 or handling device 35 is removed. In part B at a lower side of the screen, responsible factor for the abnormality, corrective measure, and operational procedure for recovery(method of recovery) are displayed. Part B has a number of pages corresponding to the number of responsible factors (about three factors at mamimum), and as FIG. 22 shows, when screen display switch 47 is manipulated for "next page" or "preceding page", indications on abnormality factor, corrective measure, and method of recovery are sequentially changed. Part B is also displayed until abnormality has been removed.

Examples of screen presentations of abnormality message are shown in FIGS. 23A and 23B. These are examples wherein there are two responsible factors. Factors, corrective measures, and recovery operation are indicated over two pages, and different corrective measures are clearly shown for different factors.

In this manner, where abnormality should occur, ordinary operation screen is switched to abnormality message screen, and the content of abnormality, factor, action, and recovery procedure are displayed until the abnormality is removed. Therefore, the operator need not have any operation manual or instructions and can quickly cope with the abnormality for recovery. This will no doubt lead to operating efficiency improvement.

What is claimed is:

1. A control system for an automatic warehousing facility provided with:
   racks capable of storing goods in plural lots;
   an incoming and outgoing goods handling device for handling incoming goods to be stored in the racks and outgoing goods to be withdrawn from the racks;
   a control panel having means for effecting visual display on a screen;
   said control system comprising:
   control means for allowing said incoming and outgoing goods handling device to be automatically operated on the basis of input operation data on the storage and retrieval of goods, said control means being incorporated in said control panel;
   means for detecting any abnormality with the incoming and outgoing goods handling device and for outputting an abnormality code corresponding to the abnormality;
   means for storing data, in advance of occurrence of abnormalities, on the contents of each abnormality, cause, corrective measure and method of recovery for each abnormality code, said storing means being incorporated in said control panel;
   means for retrieving the data stored upon receipt of an abnormality code and for outputting data corresponding to the abnormality code to the screen display means and causing the data to be displayed, said retrieving means being incorporated in said control panel; and
   said control panel being disposed at an end of a travel zone allotted for said incoming and outgoing goods handling device.

2. A control system for an automatic warehousing facility as set forth in claim 1, further comprising:

means for inputting to said control panel operation data including data on operation modes including incoming mode and outgoing mode, data on name and/or item number of goods, and data on the quantity of goods;

inventory control means for storing data on the quantity of goods for each name or item number of goods which is inputted to the control panel in the case where the operation mode is incoming mode, and for rewriting said stored data on the quantity of goods into data on the quantity of goods as at the end of the outgoing operation in the case where the operation model is outgoing mode, said inventory control means being incorporated in said control panel; and control means for outputting to the screen display means for display thereon data on the quantity of goods for each name or item number of goods which are stored in the inventory control means, according to a preset format, said control means being incorporated in said control panel.

3. A control system for an automatic warehousing facility as set forth in claim 1, further comprising:

means for inputting to said control panel data on operation modes including incoming mode and outgoing mode, and data on name and/or item number of goods;

date means having a calendar function, said date means being incorporated in said control panel;

memory means operative, where said operation mode is incoming mode, to store date data of said date means at the date at which entry of goods is made, for each name and/or item number of goods which is inputted to the control panel when said entry of goods is made, said memory means being incorporated in said control panel; and means operative, were said operating mode is outgoing mode, to output said data on the date of said entry of goods which is stored in said memory means to the screen display means, and cause said data to be displayed, according to a preset format, said means operative to output said data being incorporated in said control panel.

4. A control system for an automatic warehousing facility as set forth in claim 1, further comprising:

means for detecting the condition of operation of incoming and outgoing goods handling device to obtain data thereon;

means for outputting, according to a preset format, detection data on the operation of said handling device to the screen display means and causing same to be displayed, in human language, said means for outputting being incorporated in said control panel.

5. A control system for an automatic warehousing facility as set forth in claim 4, further comprising:

means for inputting preset input data to the control panel with respect to each particular kind of the detection data on the condition of operation of the incoming and outgoing goods handling device which data are present in plural kinds, in order to enable the different kinds of said data to be selectively outputted to the screen display means as required.

6. A control system for an automatic warehousing facility as set forth in claim 1, further comprising:

memory means for storing therein said abnormality detection data, and operation data to be inputted to the control panel so as to enable incoming and outgoing goods handling operation to be carried out by the incoming and outgoing goods handling device, said memory means being incorporated in said control panel; and means for outputting the data stored in the memory means, as collected actual data and according to a preset format, to the screen display means causing same to be displayed accordingly, said means for outputting being incorporated in said control panel.

7. A control system for an automatic warehousing facility as set forth in claim 6, further comprising means for inputting preset input data to the control panel with respect to a desired kind of actual result data in order to enable the desired kind of data to be outputted to the screen display means.

* * * * *